United States Patent [19]

Taylor et al.

[11] Patent Number: 5,072,618

[45] Date of Patent: Dec. 17, 1991

[54] ADJUSTABLE LPG GAUGE

[75] Inventors: Carl A. Taylor, Carollton; Robert E. Hrncir, Dallas, both of Tex.

[73] Assignee: Rochester Gauges, Inc., Dallas, Tex.

[21] Appl. No.: 585,997

[22] Filed: Sep. 21, 1990

[51] Int. Cl.$^5$ .............................................. G01F 23/76
[52] U.S. Cl. ...................................... 73/317; 73/322.5
[58] Field of Search ................................ 73/317, 322.5

[56] References Cited

U.S. PATENT DOCUMENTS

| 917,808 | 4/1909 | Stecker | 73/317 |
| 1,072,122 | 9/1913 | Johnston | 73/317 |
| 2,651,200 | 9/1953 | Colburn | 73/317 |
| 3,137,168 | 6/1964 | Scully | 73/317 |
| 3,306,106 | 2/1967 | Glasgow | 73/322.5 |
| 3,320,922 | 5/1967 | Taylor et al. | 73/317 X |
| 3,463,843 | 8/1969 | Taylor et al. | 73/322.5 X |
| 4,635,480 | 1/1987 | Hrncir et al. | 73/322.5 |

Primary Examiner—Daniel M. Yasich
Attorney, Agent, or Firm—Richards, Medlock & Andrews

[57] ABSTRACT

Ad adjustable gauge 10 is disclosed for use in indicating the level of LP gas in a tank within a range of tank diameters, for example between thirty and forty-one inches. A significant advantage of the LP gas gauge 10 is that a single gauge can be easily adapted for use in a tank of diameter within the pre-selected range by simply removing a length of portion 44 of the float rod roughly equal to the difference in the diameter of the maximum tank for which the gauge is adapted and the actual diameter of the tank in which the tank is entitled.

5 Claims, 4 Drawing Sheets

ADJUSTABLE LPG GAUGE

TECHNICAL FIELD

This invention relates to measuring the level of a liquid in a container, and specifically to a container of liquefied petroleum (LP) gas.

BACKGROUND OF THE INVENTION

LP gas storage tanks are in common use as a source of energy in mobile applications and stationary applications too far from a centralized natural gas or other energy source. For example, LP gas tanks are often found on mobile homes for use in heating, cooking, and refrigeration in a mobile environment. Many homes and businesses in the country have LP gas tanks permanently mounted exterior the housing structure to supply the energy needs of the home or business. Tanks used in a stationary environment have become fairly standarized and are commonly cylinders of diameter between thirty and forty-one inches. The tanks are usually installed on their side with their elongate axis of symmetry horizontal.

In most LP gas installations, it is desirable to have a gauge or similar mechanism to constantly monitor the level of the LP gas within the tank. In a stationary installation, such gauges have often taken the form of a level gauge having a pivoting rod with a float at one end and a counter-balance weight at the other end. A counter-balance weight is necessary because the specific gravity of the LP gas is so low. The float will float atop the surface of the fluid and the rod pivots to move the needle of the gauge to indicate the fluid level.

To date, each liquid level gauge installed must be sized or constructed for an exact fit for the actual size or diameter of the tank concerned. This requirement forces the manufacturer and supplier to manufacture and warehouse a large inventory of gauge configurations, a situation which leads to inconvenience and increased cost. The only other alternative has been a gauge with an adjustable support. However, even an adjustable support gauge requires the float assembly be ordered, sized and constructed for an exact fit for the actual size of the tank concerned. For replacement gauges, this requirement is particularly onerous as it is time consuming and expensive for the dealer, service organizations, and ultimately, the consumer.

A need therefore exists for a gauge which can be universally adapted to the common LP gas tank sizes between thirty and forty-one inch diameter to eliminate the currently existing inventory difficulties.

SUMMARY OF THE INVENTION

In accordance with one aspect of the present invention, an adjustable gauge is provided for use in measuring the level of LP gas in a storage tank where the storage tank has a height lying within the range from a minimum height to a maximum height. The gauge includes a gauge head mounted on the storage tank. The gauge head includes a gear assembly having a first gear pivotal about a first axis and a second gear pivotal about a second axis perpendicular to the first axis. The first and second gears have teeth which are engaged so that rotation of the first gear about the first axis causes rotation of the second gear about the second axis. The gauge head further includes a LP gas level indicator mechanism connected to the second gear. The adjustable gauge further has a float rod having a first end and a second end, the length of the float rod suitable to install the adjustable gauge in a tank of maximum height. The first end of the float rod is secured to the first gear. A float is engaged at the second end of the float rod, the float designed to float in the LP gas so that the position of the float, float rod and first gear is determined by the level of LP gas in the tank. The adjustable gauge is mounted in a tank of a specific height by disengaging the float from the second end of the float rod and removing a length of the float rod from the second end approximately equal to the difference in height between the maximum height and the actual height of the tank, then reengaging the float on the second end of the shortened float rod.

In accordance with another aspect of the present invention, the storage tank maximum diameter is forty-one inches and the minimum diameter is thirty inches.

BRIEF DESCRIPTION OF THE DRAWINGS

Further objects and advantages of the invention will become more apparent from the following description and claims, and from the accompanying drawings, wherein:

DETAILED DESCRIPTION

Figure 1:
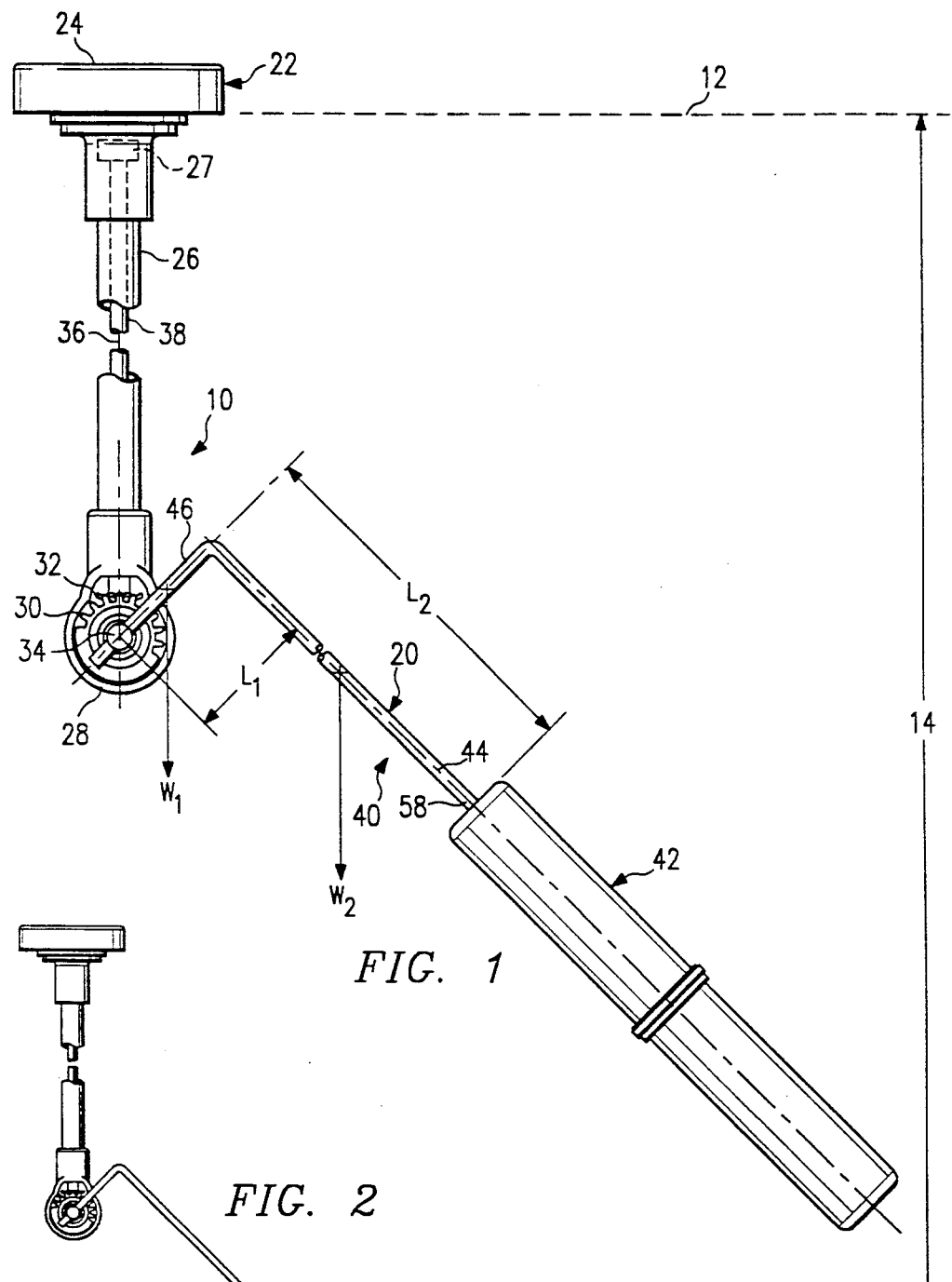
FIG. 1 is a side view of an adjustable gauge forming a first embodiment of the present invention in the configuration as supplied to the installer, which can be directly installed in a tank having the maximum height in the range of height for which the gauge is designed.

With reference now to the figures, an adjustable LP gas gauge 10 forming a first embodiment of the present invention is illustrated. The gauge 10 is adaptable for use in an LP gas tank 12 having a height 14 within a range between a maximum height 16 and a minimum height 18. The gauge does not require recalibration for installation in any tank within the height range and the gauge is adapted for use in a tank of a specific height by simply removing a portion of the float rod 20, as will be discussed hereinafter. Thus, the gauge 10 has a significant advantage over prior designs in minimizing the inventory and complexity of installing an LP gas gauge in a specific tank configuration.

As shown in FIG. 1, the gauge includes a gauge head 22 of conventional nature which is mounted on the tank 12. The gauge head includes a dial assembly 24 which contains a dial face indicating fluid level and a pointer or needle, which is moved by the mechanism of the gauge, to indicate the fluid level in the tank. The dial assembly 24 is secured on one end of a tube 26, with a gear assembly 28 mounted at the other end of the tube.

The gear assembly 28 includes meshed first and second gears 30 and 32, respectively. The first gear 30 is mounted in the gear assembly 28 for pivotal motion about a first axis 34, while the second gear 32 is mounted for pivotal motion about a second axis 36 which is perpendicular the first axis. The second gear 32 is secured at the end of a pivot rod 38 which extends through the tube 26 and into the dial assembly 24. Rod 38 is supported for pivotal motion within tube 26. The indicating needle is secured to the pivot rod 38 so that pivotal motion of rod 38 creates a corresponding movement of the needle within the dial assembly.

A float assembly 40 is attached to the first gear 30 and includes a float rod 20 and a float 42. As can be readily understood, the float and float rod will float at the surface of the fluid level within the tank and, as the level in the tank varies, the float and float rod will induce pivotal motion of the first gear 30 about the first axis. The first gear, in turn, pivots the second gear, pivot rod 38 and the indicating needle in the dial assembly to provide a visual indication of the fluid level in the tank.

As will be described in greater detail hereinafter, the gauge 10 can be adapted for use in a tank of specific height by decreasing the length of portion 44 of the float rod 20 from the maximum length as shown in FIG. 1. The length that portion 44 is shortened is equal approximately to the difference between the maximum height and the specific height of the tank in which the gauge is being installed.

The float rod 20 is made up of portion 44 and a portion 46 at right angles to each other. The portion 46 has a length L1, a diameter D1 and a density determined by the material which forms the rod. Thus, portion 46 defines a weight vector W1 which exerts a force moment about the first axis 34. Similarly, the portion 44 has a length L2, a diameter D2 and a density determined by the material of which the rod is formed, which defines a weight vector W2. Weight vector W2 also generates a force moment about the first axis 34. Finally, the float 42 itself has a weight vector WFL which also creates a force moment about the first axis 34.

Figure 2:
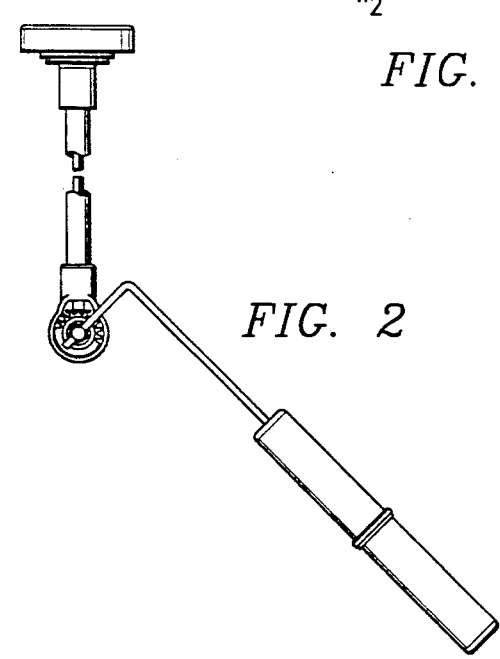
FIG. 2 is a side view of the gauge configured for use in the tank of minimum height within the range of heights for the gauge.
Figure 3:
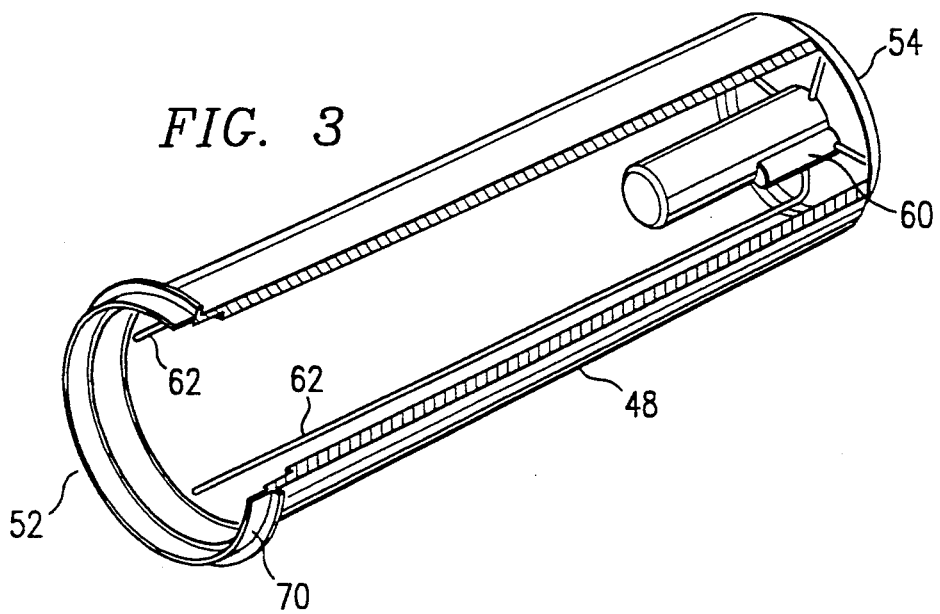
FIG. 3 is a perspective view of the top of a float used in the gauge of the present invention.
Figure 4:
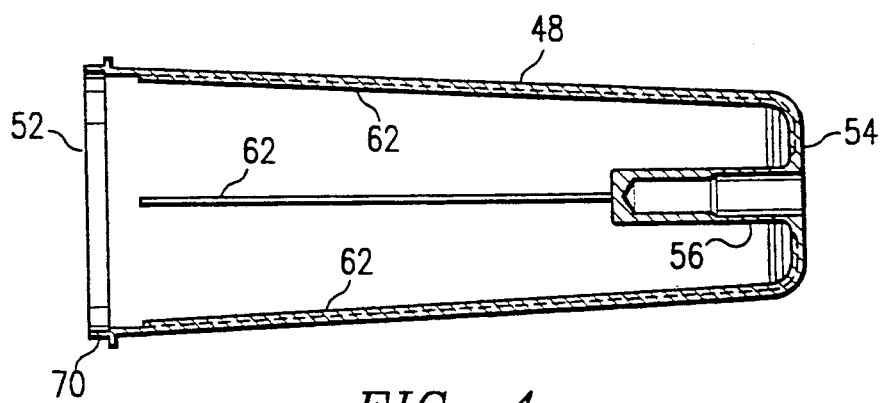
FIG. 4 is a side cross-section of the float top.
Figure 5:
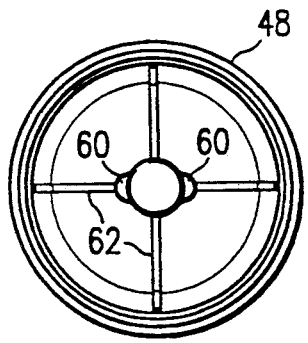
FIG. 5 is an end view of the float top.
Figure 6:
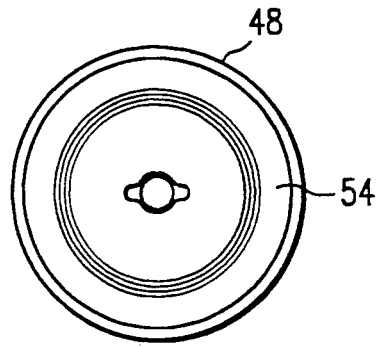
FIG. 6 is an opposite end view of the float top.
Figure 7:
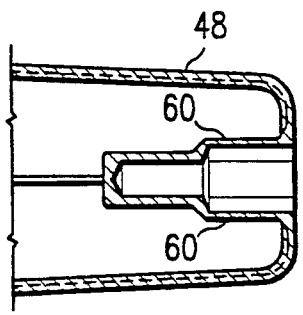
FIG. 7 is a partial cross-sectional view of the float top at a 90° angle from the view of FIG. 4.

It is evident that the weight vectors of the rod portions and float are cumulative and tend to cause the float rod and float to rotate about the first axis in a clock-wise direction as shown in FIGS. 1 and 2. To counter-balance this force moment is the buoyancy of the float 42 itself in the LP gas, denoted as $V_{FL}$ BUOY. In an equilibrium position, the moment created by the buoyancy force about the first axis will exactly equal the force moment of the weights of the float rod and float. As a result, no counter-weight is required.

The float 42 itself must be very carefully designed to operate properly in the environment of LP gas, usually a 50—50 mix of butane and propane. Such a mix has a very low specific gravity, in the order of 0.55.

The details of the float 42 are illustrated in FIGS. 3-10. The float can be seen to be formed of two portions, a float top 48 and a float bottom 50, which are fastened together end-to-end to define a hermetically sealed interior volume. The float top 48, as seen in FIGS. 3-7, has a length of 3.25 inches with a diameter which tapers from 0.972 inches at the inner end 52, at a draft not to exceed ¾°, to the outer end 54. At the outer end 54 is formed a female boss 56 which receives the second end 58 of the portion 44 of the float rod 20. The float preferably has a wall thickness of about 0.025 inches. The female boss 56 has a pair of reinforcing ribs 60 formed thereon. Four reinforcing ribs 62 are formed along the inner surface of the float top to provide enhanced strength to the float top.

Figure 10:
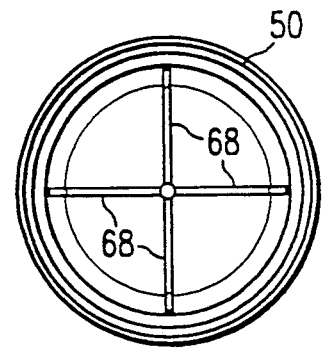
FIG. 10 is an end view of the float bottom.
Figure 8:
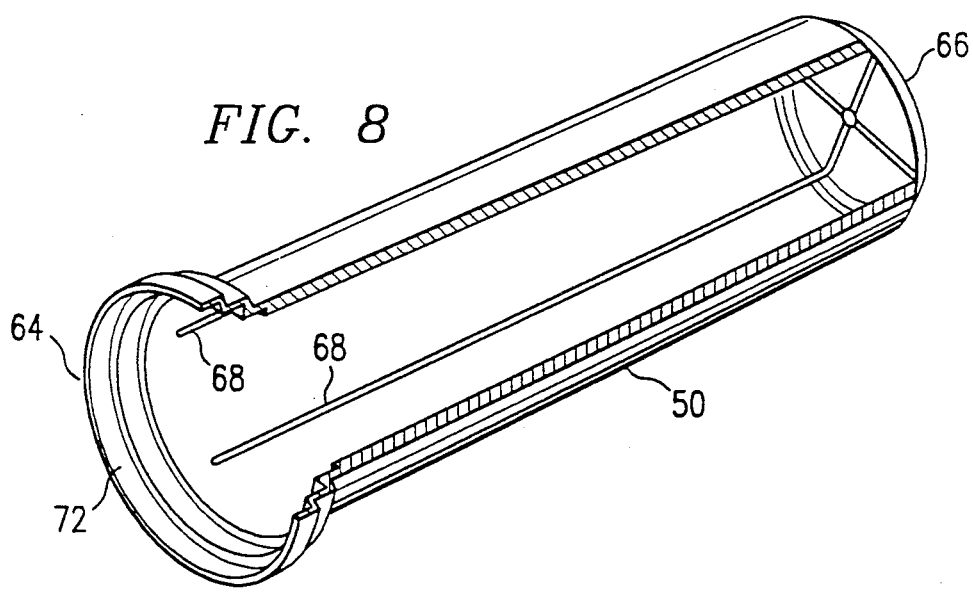
FIG. 8 is a perspective view of the bottom of the float.
Figure 9:
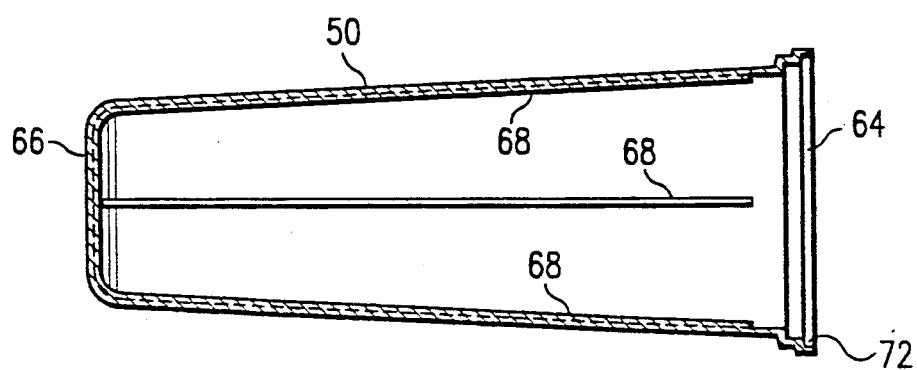
FIG. 9 is a cross-sectional view of the float bottom.

The construction of float bottom 50 is illustrated in FIGS. 8-10. The float bottom 50 has a length of 3.25 inches and tapers from an outer diameter of 0.972 inches at its inner end 64 at a maximum ¾° draft to the outer end 66. The float bottom 50 similarly has four ribs 68 formed along the inside thereof for reinforcement. The float top and bottom have a male portion 70 and female portion 72, respectively, where the top and bottom are mated and secured together in a fluid tight manner to prevent fluid from entering the interior of the float. Preferably, the float is constructed of a synthetic resin material manufactured by General Electric Company of Fairfield, Conn. under the trade name ULTEM, with a natural color and a 20% glass reinforcement.

Figure 11A:
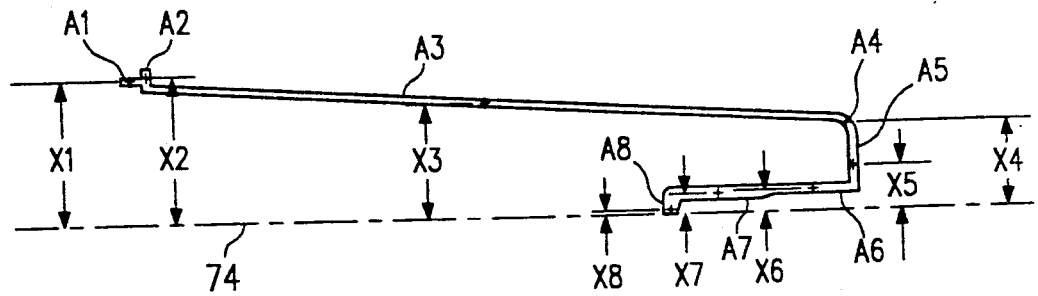
FIGS. 11A-D are representations of the float to calculate the weight and buoyancy factors thereof.
Figure 11B:
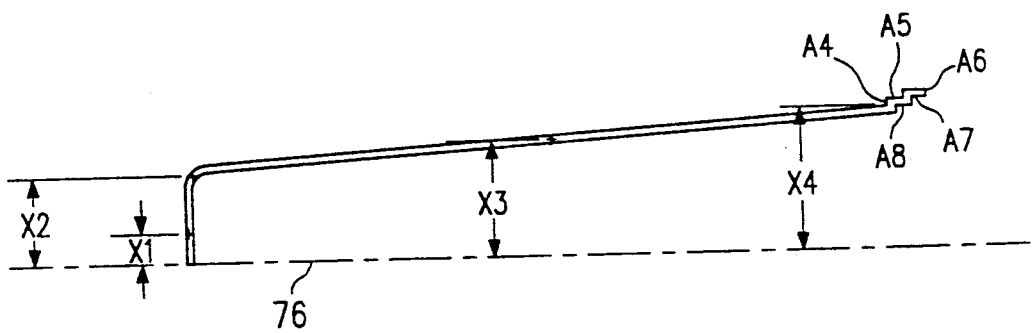

With reference now to FIGS. 11A-D, the volume and buoyancy calculations required in the design of the float 42 will be described. The weight of the float top can be calculated relatively precisely by dividing the cross-section float top into eight specific area increments A1-A8 as seen in FIGS. 11A and 11B. In the preferred design, the sum of these areas is 0.13178 square inches. The volume of the top portion can then be approximated by multiplying each incremental area A by $2\pi$ times its respective radius X from the center line 74 of the float top. The top float volume in the preferred device is 0.270 cubic inches. The volume of the ribs 62 is their area times their length times four. For the preferred embodiment, this is 0.000555 inches times 3.222 inches times 4, or 0.00715 cubic inches. The total volume of the top portion is thus 0.27715 cubic inches.

With reference to FIG. 11B, float bottom 50 can also be approximated by eight cross-sectional areas A1-A8. In the preferred construction, the sum of these areas is 0.0921 square inches. Again, the volume of the material in the float bottom can be calculated by multiplying $2\pi$ times each area and its respective radius X from the center line 76 of the float bottom. In the preferred embodiment, this results in a volume of 0.248 cubic inches. The volume of the ribs 68 is again calculated by their area times their length times 4 or, in the preferred embodiment 0.000555 inches times 3.345 inches times 4 or 0.00743 cubic inches. With the material which forms the float having a specific gravity of 1.42, the total float weight is 0.02731 pounds.

Figure 11C:
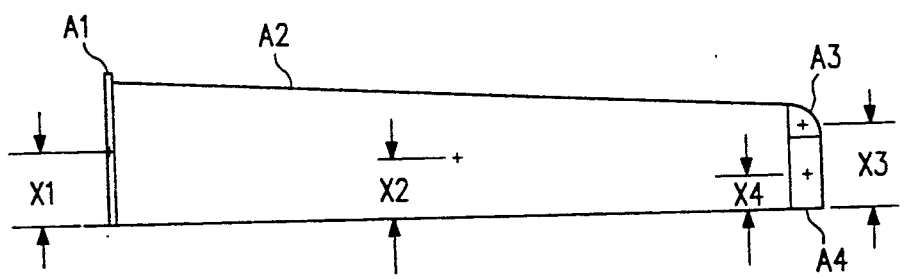

With reference now to FIG. 11C, the buoyancy of the float top can be calculated as an approximation based on selected areas in the cross-section of the float top, specifically four areas A1-A4. In the preferred embodiment, the sum of these areas is 1.46534 square inches. The volume of the buoyancy can then be calculated by multiplying each specific area A by the radius X that the center of that area lies off of the center line 74 and $2\pi$. The resulting buoyancy volume of the top in the preferred embodiment is 2.138 cubic inches.

Figure 11D:
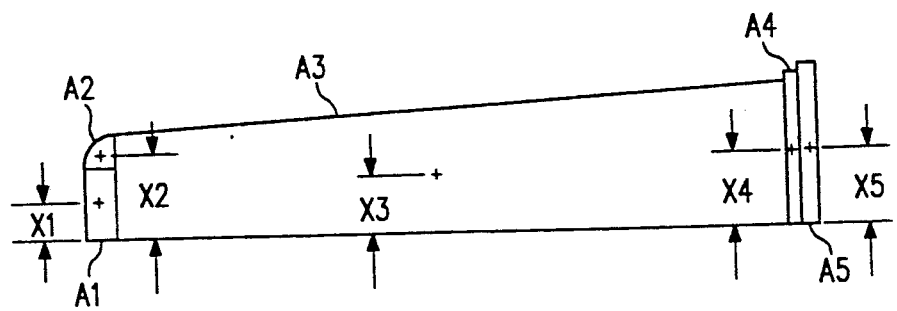

With reference FIG. 11D, the volume buoyancy of the float bottom 50 can similarly calculated by defining 5 specific areas A1-A5. Each specific area is then multiplied by $2\pi$ and the radius X of the center of each area. In the preferred embodiment, the volume buoyancy of the float bottom is 2.234 cubic inches. Assuming a 50—50 mix of butane and propane, which results in a fluid of specific gravity of 0.55, the LP gas weighs 0.1986 pounds for cubic inch.

In the preferred embodiment, the length L1 of portion 46 is 1.5 inches and the rod is ⅛ inch diameter aluminum having a density of 0.099 pounds for cubic foot.

Portion 46 thus has a weight of 0.0028 pounds. The maximum length of the portion 44 is 29.47 inches, and is also of ⅛ inch diameter with the same density which results in a weight of 0.056 pounds. At 60% submergence of the float 42, the moments about the first axis between the weights of the float rod and float and the buoyancy of the 60% of the float submerged are equal. If the tank in which the gauge is used is a height less than maximum, the length of the portion 44 is reduced from the second end a distance roughly equal to the difference in the height between the maximum height and the specific height of the tank in which the gauge is installed. For the shortest height of 30 inches, the length of the portion 44 is reduced to 19.027 inches. At 47% submergence of the float 42, the moments about the first axis are balanced.

Thus, the gauge 10 can be seen to be useable in a range of tank heights between a maximum value and a minimum value, preferably 41 inches and 30 inches, by simply reducing the length of the portion 44 of the float rod from its original length suitable for use in a tank of the maximum height by removing or cutting off a portion of length equal to the difference between the specific height of the tank in which the gauge is installed and the maximum height.

In addition to the buoyancy characteristics required by the float 42, the float must be capable of withstanding the pressure forces existent within the tank, which can reach 750 PSI. By using the material referred to previously, ULTEM 2000, having a yield stress of 20,000 PSI, the float 42 constructed in accordance with the teachings above will have a safety factor of about 1.5 from collapse at a maximum pressure of 750 PSI.

While one embodiment of the present invention has been illustrated in the accompanied drawings, and described in the foregoing detailed description, it will be understood that the invention is not limited to the embodiment disclosed, but is capable of numerous rearrangements, modifications and substitutions of parts and elements without departing from the scope and spirit of the invention.

We claim:

1. An adjustable gauge for use in measuring the level of LP gas in a storage tank where the storage has a height lying within a range from a minimum height to a maximum height, comprising:

a gauge head mounted on the tank, said gauge head including a gear assembly having a first gear mounted thereon for pivotal movement about a first axis and a second gear mounted thereon for pivotal movement about a second axis at an angle to the first axis, the first and second gears each having teeth which are engaged so that rotation of one gear includes a corresponding rotation in the other gear;

a float rod having a first end and a second end, the float rod being secure at its first end to the first gear of the gear assembly, the length of the float rods suitably dimensioned for installing the adjustable gauge in a tank of height equal to the maximum height;

an elongated float formed out of two portions, one of said float portions having means to receive the second end of said float rod, said float capable of floating in LP gas and supporting the float and float rod through its buoyancy, said float engaged to the float rod at the second end thereof;

the adjustable gauge being adjusted for use in a specific height tank by disengaging the float from the float rod, removing a length of the float rod from the second end thereof, approximately equal to the difference in height between the maximum height and the actual height of the tank, and reengaging the float on the float rod.

2. The adjustable gauge of claim 1 wherein the gauge is suitable for installation in a storage tank having a height in the range from 41 to 30 inches.

3. The adjustable gauge of claim 1 wherein the length of the float rod is about 36 inches for a fluid tank of height 41 inches.

4. The adjustable gauge of claim 1 wherein the first end of the float rod has a first portion and a second portion at right angles thereto, the second portion being varied in length to adjust the gauge to a specific tank height.

5. The adjustable gauge of claim 1 wherein said LP gas in the storage tank is pressurized at a pressure up to 750 psi, said float retaining the buoyancy to support the float and float rod when exposed to LP gas at 750 psi.

* * * * *

UNITED STATES PATENT AND TRADEMARK OFFICE
CERTIFICATE OF CORRECTION

PATENT NO. : 5,072,618
DATED : December 17, 1991
INVENTOR(S) : Taylor, et al.

It is certified that error appears in the above-identified patent and that said Letters Patent is hereby corrected as shown below:

On the cover page, under the heading of Inventors, please delete the word "Carollton" and substitute therefor the word -- Carrollton --.

Col. 4, line 21, immediately following the word "cross-section", please insert the words -- of the --.

Col. 4, line 57, immediately following the word "reference", please insert the word -- to --.

Col. 4, line 58, immediately following the word "can", please insert the word -- be --.

Col. 6, line 33, immediately following the numeral "41", please insert the word -- inches --.

Signed and Sealed this

Fourth Day of May, 1993

Attest:

MICHAEL K. KIRK

Attesting Officer

Acting Commissioner of Patents and Trademarks